3,065,082
CREAM STYLE CORN PROCESS
Ellsworth W. Eue, Le Sueur, Minn., assignor to Green Giant Company, Le Sueur, Minn., a corporation of Minnesota
Filed Apr. 21, 1960, Ser. No. 23,777
4 Claims. (Cl. 99—186)

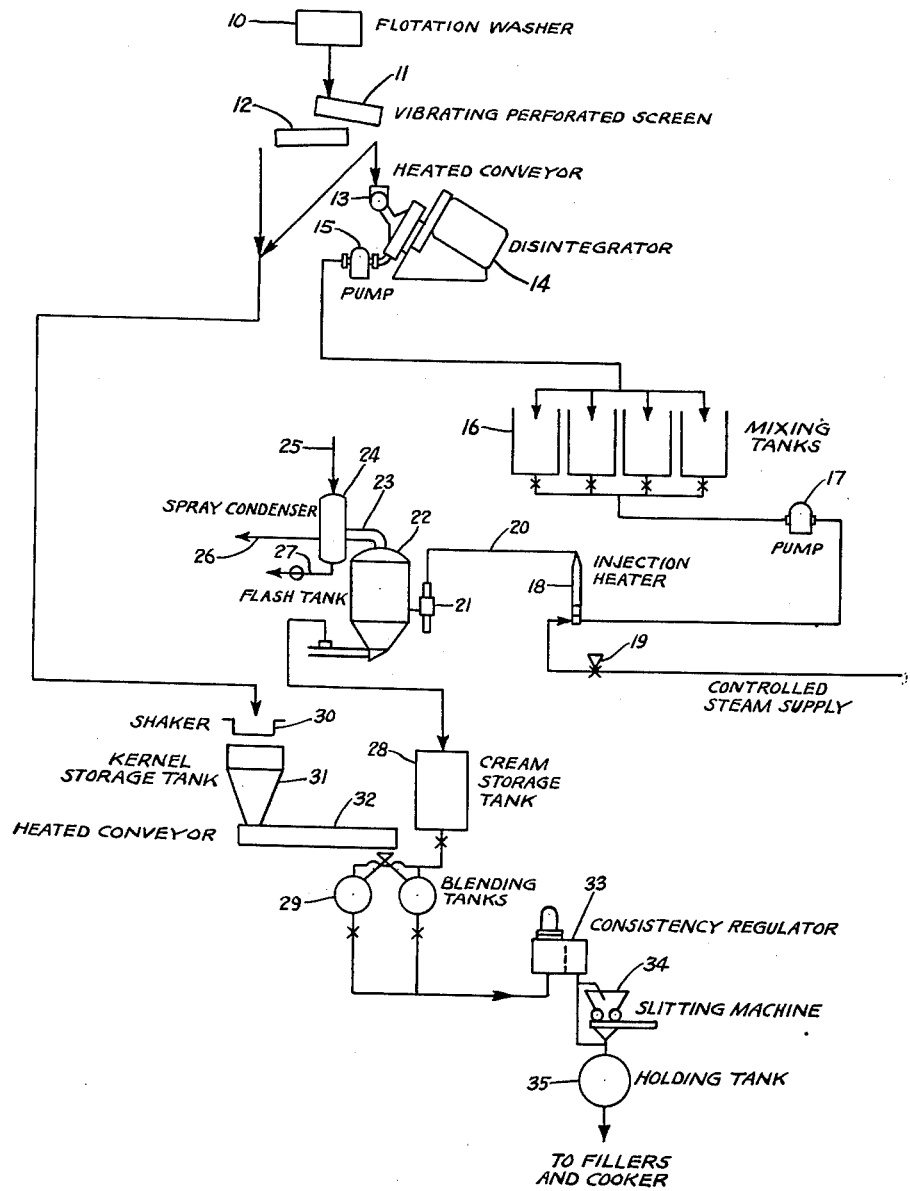

This invention relates to an improved method for the production of canned or frozen cream style corn for human consumption. The specific object of the present invention is the production of canned cream style corn products of a bright natural color and flavor without curdling or graininess of the cream component.

It is a further object of this invention to produce a canned cream style corn product which can be heat sterilized in the can in a rotary agitating pressure cooker without curdling or graininess of the cream component and without color degradation or heat decomposition or caramelization of the corn.

It is a still further object of this invention to produce a cream style corn product of high quality without excessive attrition or mechanical damage to the kernel component, such as is frequently caused by pumping and mechanical handling, and without other further changes which break down the kernels to cause low kernel identity and undesirable appearance.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Much study has been devoted to methods of precooking cream style corn for the asserted purpose of preventing curdling or coagulation of the cream component. The result is usually achieved by the addition of special thick boiling starches or by the use of special blanching treatment. One reliable method of precooking cream style corn without curdling has been to heat the product continuously by direct steam injection of the order of 240° F., followed by flash cooling under vacuum to about 195° F., prior to filling, closing and sterilizing. This method provides protection against curdling of the cream component but the strenuous treatment to which the kernels are subjected tends to give the product a low kernel character and detract from the appearance of the product. The kernels often tend to explode or puff during flashing under vacuum. The several pumpings necessary to move the product from one stage of processing to the next further reduces the kernel identity.

According to the present invention, only the cream component is subjected to rapid high temperature heating, followed by flash cooling, to partially coagulate the protein content of the corn and other ingredients. The cream component consists of finely ground kernels to which are added starch and a brine made up of an aqueous solution of sugar and salt. The cream component is heated and flash cooled while in a very finely divided state so that when the product is later sterilized there is no apparent graininess or curdling and a minimum of water separation.

The cream style corn, according to the present invention, is produced by adding whole kernels or parts of kernels to the cream component which has been subjected to rapid heating and flash cooling. Before admixture, the whole kernels are desirably also heated to the approximate temperature of the cream component after flash cooling. This is to prevent lowering the initial temperature of the mixture to a container filling temperature below that necessary for adequate sterilization and also to assure an adequate residual can vacuum after processing and cooling.

The cream component and the kernel component are mixed in the proportions desired. The combined mixture is passed through a conventional consistency regulator for a final consistency adjustment. If necessary, the combined mixture may be passed through a slitting machine in which the kernels are sliced at random to give the character and appearance usually associated with high quality cream style corn. The product is passed to a filling machine. After being filled into cans and the cans are hermetically sealed, the product is passed through a rotary pressure cooker or other agitating high temperature, short time cooker for sterilization and cooling. Thereafter, the canned product is cooled, packed into containers and stored or shipped. The method of the present invention is equally adapted to use in the aseptic canning technique. By that process the food product is sterilized in bulk for relatively short periods of time and then is filled into sterilized cans and sealed under aseptic conditions.

The present invention is related to and constitutes a modification of and improvement over the invention described and claimed in the copending application of common assignment filed by John L. Welch, Ser. No. 559,416, on January 16, 1956, and issued as Patent No. 2,941,889 on June 21, 1960.

The present invention is illustrated by the single figure of the drawings which is a flow sheet showing schematically the processing apparatus and processing steps.

Referring to the drawings, raw, freshly cut, succulent, whole kernels of sweet corn are passed through a flotation washer 10 for the purpose of removing extraneous material such as corn silk, husk, pieces of cob or the like. The washed whole kernels are preferably passed over a vibrating perforated screen 11 which permits the smaller kernels, such as those from the tip end of the ear, to drop through to a suitable conveyor means 12 while retaining the larger kernels, such as those grown on the large end of the ear. While optional, this step has been found to improve the end product by diverting the smaller kernels to the kernel component where they are desirable while at the same time keeping them out of the cream component where, due to their higher percentage of moisture, they could cause excessive thinning. A screen with $11/_{32}$ in. perforations has been found to be satisfactory for separating small kernels from large kernels.

The large kernel fraction from the vibrating screen is passed through a heated conveyor 13 (Thermascrew) wherein live steam at low pressure of about seven pounds per square inch gauge is sparged into the corn to accomplish a quick heating and partial inactivation of the enzymes prior to grinding. An exemplary form of heated conveyor which may be used to raise the temperature of the corn kernels before grinding is a 6 in. diameter motor driven screw or helix encased in a housing having steam sparge pipes along its six foot length. In the heated conveyor, the temperature of the corn is increased to above 170° F. If this step is omitted, it is possible that enzyme activity may tend to introduce bitter flavor into the product.

The fraction of large corn kernels is then fed to any suitable disintegrator 14. A preferred form of disintegrator includes a bladed rotor rotating at about 3600. R.P.M to macerate the kernels and drive them through a screen. A screen with 3/16 in. perforations has been found to be suitable. The ground kernels assume a creamy or semi-liquid state in the disintegrator. This ground corn is then pumped by a positive displacement pump 15 to a battery of mixing tanks 16 equipped with motor driven agitators.

The ground corn or cream from the disintegrator is added alternately to each of the mixing tanks into which measured amounts of brine (sugar and salt solution) and starch have previously been added. As each tank 16 is filled, the contents are pumped by a positive displacement feed pump 17 to a steam injection heater 18. One form of injection heater 18 is shown and described in detail in the aforementioned co-pending Welch application. A prepreferred form of injection heater is an enclosed cylindrical stationary helix positioned vertically, through which the cream product is pumped under pressure. The cream product is pumped into the lower end of the chamber and out through the top. Surrounding the helix is a case and ring or screen having a large number of circumferentially spaced and axially extending rows of tangentially drilled holes through which the steam is injected into the product under controlled pressure and temperature conditions.

Steam is condensed and intermixed with the product. The temperature of the product is thus raised very rapidly from about 100° F. to between about 185° F. to 250° F. and preferably between 212° F. and 240° F. Steam is introduced to the injection heater 18 from a controlled steam supply line in which the steam pressure is between 50 and 90 lbs. per square inch gauge. The steam passes through a control valve 19. Immediately following the injection heater 18 and directly connected to it is a section of pipe 20 sufficiently long to provide a holding time of approximately 15 seconds for the product. Then the cream product passes through a back pressure device 21 and into a flash tank 22.

The back pressure device 21 is essentially a cylinder and piston with product inlet and outlet. The cream product is pumped by feed pump 17 against the top of the piston and compressed air of controlled pressure is applied to the bottom. Sufficient clearance allows the cream product to flow even when the piston is in raised position. Sufficient pressure is applied to maintain a pressure in the product line slightly above the saturation pressure of steam at the operating temperature. For 240° F. operating temperature, a back pressure of about 12 lbs. per square inch gauge has been used. This eliminates vibration and noise effects due to collapse of large steam bubbles and prevents premature flashing of the product and thereby provides better control.

The flash tank 22 is connected directly to the back pressure device. The flash tank or vacuum pan is a comparatively large chamber (48 in. diameter by 60 in. high) in which a vacuum of about 1 to 15 inches of mercury is maintained. The flash tank is equipped with a vapor line 23 out of the top to a spray condenser 24. Fresh condensing water is introduced through a supply line 25 and sprayed to remove the condensible gases. The condenser is connected through a line 26 to a vacuum source for removal of the non-condensible gases. Condensate is removed from the condenser through a line 27 by means of a suitable condensate pump. The cream product is flash cooled to between about 190° and 210° F. and deaerated in the flash tank 22. This product is then pumped to an optional cream storage tank 28 or directly to blending tanks 29.

In the blending tanks 29 the cream is combined volumetrically with kernels which passed through the vibrating screen 11 plus such a quantity of larger kernels as may be required to produce the desired kernel character. The number of small kernels at any time will vary with the maturity and variety of corn being run over a fixed screen size opening. Corn of higher maturity or of a variety characterized by larger kernels will have a lower percentage passing the screen. Therefore, it is desirable to be able to add back kernels which were retained on the screen initially.

The small kernel fraction, with or without some large kernels, is dewatered on a dewatering screen or shaker 30 and then stored in a hopper or storage tank 31 for use as needed. The whole kernels are heated from approximately 60° F. to about 190° to 210° F. by passage through a heated conveyor 32 (Thermascrew). These heated whole kernels are then added volumetrically to the cream component previously added to the blending tanks 29, which are used alternately. The heated conveyor 32 is similar in design to the heated conveyor 13 which has previously been described, but is larger due to intermittent operation. An exemplary heated conveyor may be of the order of 12 in. in diameter and 15 ft. long encasing a motor driven screw or helix and equipped with steam sparge pipes along its length.

After each blending tank 29 is filled in sequence to the desired proportions, the mixed produce is passed through a consistency regulator 33. From the consistency regulator, the mixed product may optionally be passed through a slitting machine 34 before being passed to a holding tank 35 or directly to the filling machine (not shown). Where used, a preferred form of slitting machine has a series of circular knives mounted on a motor driven shaft and meshing with a rubber covered drum or roller. The mixture of whole kernels and cream is passed through the slitting machines to cut the kernels at random producing a kernel character of the type normally associated with cream style corn, rather than with whole cut kernels in cream. When holding tank 35 is used the product is held only temporarily. Whether passed through the holding tank or directly to the filling machine, the product is then filled into cans, hermetically sealed, heat sterilized, cooled and stored or shipped. Filling, closing and sterilization take place in standard equipment available for that purpose. Sterilization of the canned product is accomplished in from about 13 to 20 minutes at temperatures ranging from about 250° to 280° F. in agitating cooking equipment. Sterilization in bulk for aseptic canning is accomplished at about 285° F. to 300° F. for about 30 to 120 seconds in a continuous flow tubular heat exchanger or similar equipment.

The invention is further illustrated by the following examples:

*Example 1*

Whole kernels of raw, freshly cut sweet corn were washed to remove extraneous material such as corn silk, bits of husk or pieces of cob. A fraction of the whole kernels was heated to about 170° F. by passage through a heated screw conveyor and ground in a disintegrator to produce 119 gallons of cream. This cream was added in a mixing tank to a previously prepared brine solution and corn starch. The brine was made up of four pounds of sugar and 0.8 pound of salt per gallon and 56 gallons of brine and 60 pounds of corn starch were mixed with the cream from the distintegrator.

This mixture was pumped to an injection heater and the temperature was raised to 240° F. The pressure in the product line was 12 pounds per square inch gauge. Steam pressure in the supply line to the control valve was 82 lbs. per square inch gauge. The product was then flash cooled to 195° F. in a flash tank under a vacuum of 7 in. of mercury and the cream component was then pumped to a blending tank. In the blending tank, 175 gallons of whole kernels, heated to about 195° F. in a heated screw conveyor, were added to the cream component. This mixture was then adjusted to the desired consistency and passed through a slitting machine to the filling and closing machines.

The total product including steam condensate amounted to 375 gallons of cream style corn and yielded 112 cases of 303 x 406 cans, 24 cans per case. After sealing, the cans of cream style corn product were heat sterilized for 14 min. at 270° F. and then cooled for 8.75 min. with 52° F. water to 100° F. and stored. The resulting product had a Stormer viscosity of 8 sec. at 180° F. and a washed, drained residue of 36 percent. Washed, drained residue is a measurement used by the industry to indicate kernel character and is the percentage of solids retained on a standard 8-mesh screen after washing and draining according to a prescribed procedure. The product of this example was of medium consistency with a smooth cream and good kernel character.

*Example 2*

A further batch of cream style corn was prepared from a fraction of washed whole corn kernels. The kernels were heated and disintegrated to produce 132 gallons of ground corn cream. This was added to 56 gallons of brine and 45 pounds of starch. The cream mixture was preheated by steam injection to 240° F. and subsequently flash cooled to 195° F. It was mixed in a blending tank with 192 gal. of washed heated whole kernels. The total cream style mixture including the steam condensate amounted to 392 gal. of cream style corn and, with the water added by the consistency controller, yielded 140 cases of 24/303 x 406 cans. The conditions of processing were as described in Example 1. The Stormer viscosity of the product was 11 sec. and the washed drained residue was 40 percent. The product was of medium heavy consistency with a smooth cream and good kernel character.

*Example 3*

A further batch of cream style corn was made up from washed whole corn kernels. A fraction of the whole kernels was heated in a heated screw conveyor to 170° F. and ground in a disintegrator to produce 115 gal. of cream. To this was added 56 gal. of brine containing four pounds of sugar and 0.8 pound of salt per gallon and 60 lbs. of starch. This mixture was preheated in a steam injector to 240° F. and flash cooled in a vacuum flash tank to 190° F. The resulting cream component was mixed in a blending tank with 200 gal. of whole kernels heated in a screw conveyor to 195° F. The resulting cream style corn mixture was adjusted as to consistency and passed through a slitting machine and then filled into cans and closed. The cream style corn product including the steam condensate amounted to 399 gal. and, with the water added by the consistency controller, yielded 154 cases of 24/303 x 406 cans of cream style corn. The Stormer viscosity of the product was 13 seconds and the washed drained residue was 43 percent. The product was of heavy consistency with a smooth cream and a slightly high kernel character.

The aseptic canning method is illustrated by the following general examples:

*Example 4*

A batch of cream style corn is prepared from a mixture of ground and whole kernels according to any of the previous examples. The cream style corn is heated by steam injection to raise the temperature to about 285° F. to 300° F. The heated product is held at this temperature for about 30 to 120 seconds to achieve sterility in a steam jacketed holding tube. It is passed to a deaerator operated under vacuum conditions to flash the product to about 200° F. While continuously maintained under aseptic conditions the product is passed to a filler holding tank and from there to an aseptic filling and can sealing system. The sealed cans are then cooled to about 95° F. to 105° F. with water.

*Example 5*

According to an alternative procedure, cooling of the product is completed prior to filling into containers. A cream style product is prepared according to any of the previous examples and sterilized in bulk as in Example 4. The sterilized product is passed to a deaerator operated under vacuum conditions to flash the product to about 100° F. This relatively cool product is then passed to a filler holding tank, filled and sealed while maintained under aseptic conditions.

The process of the present invention results in a bright yellow cream component free of apparent graininess or coagulation. While it is possible that the protein content of the cream may have been partially coagulated in the steam injection precook, the subsequent flashing in vacuum results in this portion being in a finely divided state or reduced to extremely small size with the remaining protein content being sufficient to form a gel structure resulting in a minimum of water separation when the product is sterilized. The kernel character of the cream style corn produced according to the present invention is free of the uncontrolled damage or breakdown which reduces proper kernel identity. The desired percentage of kernels in the end product can be predetermined and the kernels are free from the partial disintegration resulting in other processing methods where the kernels are subjected to more and greater stresses such as pumping and mixing. While the product is free of graininess or coagulation of the cream component and has a kernel component free from mechanical damage and partial disintegration it can be processed for a comparatively short time under agitation (14 min. at 270° F.) as against a conventional cooking process of 65 min. at 250° F.) and still produce a product retaining a maximum of natural color and flavor. The coagulation-free cream style corn product of the present invention does not depend upon the use of any particular starch to prevent curdling. On the contrary, this process is carried out using a thin boiling starch and yet the product is coagulation free.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method of preparing coagulation resistant cream style corn which comprises preparing a cream component by grinding washed whole kernels, blending the cream component with a starch thickening agent in an aqueous sugar-salt solution, instantaneously heating the cream component to a temperature between about 185° F. and 250° F. by direct steam injection under superatmospheric pressure of about 50 to 90 pounds per square inch gauge, cooling the cream component to a temperature between about 190° and 210° F. and deaerating by discharging to a zone of lower pressure maintained at between about 1 and 15 inches of mercury of vacuum, blending the cream component with a solid kernel component of washed whole corn kernels heated to about the same temperature as the cooled cream component, filling the cream style corn mixture into containers and hermetically sealing, sterilizing the product under agitation by heating for about 13 to 20 minutes at a temperature from about 250° to 280° F, and then cooling.

2. A method according to claim 1 further characterized in that the cream style corn mixture is subjected to random slitting prior to filling into containers.

3. A method according to claim 1 further characterized in that the thickening agent is a slurry of a thin boiling starch.

4. A method of preparing coagulation-resistant cream style corn which comprises cutting whole corn kernels from the cob, washing the kernels to remove silk, husks, bits of cob and other extraneous material, dividing the whole kernels into two fractions, forming a cream component from one fraction by finely grinding the whole corn kernel, blending the cream component with a starch thickening agent in an aqueous sugar-salt solution, instantaneously heating the cream component to a temperature between about 185° and 250° F. by direct steam injection under superatmospheric pressure of between about 50 and 90 lbs. per square inch gauge, cooling the cream component to a temperature between about 190° and 210° F. and deaerating by discharging to a zone of lower pressure maintained at between 1 and 15 inches of mercury of vacuum, blending the cream component with the other fraction of washed whole corn kernels, said whole kernel fraction being heated to approximately the cooled temperature of the cream component prior to blending, subjecting the resulting cream style corn mixture to random slitting, filling the mixture into containers and hermetically sealing, sterilizing by heating the product under agitation for from about 13 to 20 minutes at a temperature from about 250° to 280° F. and then cooling.

References Cited in the file of this patent

UNITED STATES PATENTS

| | | |
|---|---|---|
| 2,086,338 | Sodergreen | July 6, 1937 |
| 2,540,028 | Fitzpatrick | Jan. 30, 1951 |
| 2,540,745 | Link | Feb. 6, 1951 |
| 2,592,988 | Whitmore | Apr. 15, 1952 |
| 2,941,889 | Welch | June 21, 1960 |

OTHER REFERENCES

Lord: Everybody's Cookbook, 1924, page 453.

UNITED STATES PATENT OFFICE

CERTIFICATE OF CORRECTION

Patent No. 3,065,082                        November 20, 1962

Ellsworth W. Eue

It is hereby certified that error appears in the above numbered patent requiring correction and that the said Letters Patent should read as corrected below.

Column 3, line 1, for "performations" read -- perforations --; line 14, strike out "pre-"; column 6, line 26, after "270° F." strike out the closing parenthesis; line 44, for "equeous" read -- aqueous --.

Signed and sealed this 19th day of March 1963.

(SEAL)
Attest:

ESTON G. JOHNSON                            DAVID L. LADD
Attesting Officer                              Commissioner of Patents